United States Patent [19]

Viessmann

[11] Patent Number: 4,921,163
[45] Date of Patent: May 1, 1990

[54] METHOD AND APPARATUS FOR TEMPERATURE CONTROL OF HEATING AND COOLING PLANTS

[76] Inventor: Hans Viessmann, Im Hain 24, 3559 Battenberg/Eder, Fed. Rep. of Germany

[21] Appl. No.: 94,139

[22] Filed: Sep. 8, 1987

[30] Foreign Application Priority Data

Sep. 17, 1986 [EP] European Pat. Off. ............ 86112825

[51] Int. Cl.⁵ ............................................... F24D 3/00
[52] U.S. Cl. ................................. 236/46 R; 236/91 F; 237/8 R
[58] Field of Search ................. 236/91 D, 91 R, 91 F, 236/1 R, 46 R; 165/12; 237/8 R

[56] References Cited

U.S. PATENT DOCUMENTS 4,274,475 6/1981 Rall et al. .............................. 165/12

FOREIGN PATENT DOCUMENTS

| 019344 | 11/1980 | European Pat. Off. . |
| 129140 | 12/1984 | European Pat. Off. . |
| 2811153 | 9/1979 | Fed. Rep. of Germany . |
| 3437264 | 4/1986 | Fed. Rep. of Germany . |
| 2470409 | 5/1981 | France . |
| 2569257 | 2/1986 | France . |
| 0070344 | 4/1982 | Japan ..................................... 165/12 |
| 2153554 | 8/1985 | United Kingdom ............. 236/46 R |

Primary Examiner—William E. Wayner
Attorney, Agent, or Firm—Baker, Maxham, Jester & Meador

[57] ABSTRACT

The present invention relates to a method and an apparatus for controlling the temperature of heating and cooling plants having a heat or cooling source of adjustable rated temperature via particularly a microprocessor-controlled control system. The actual outside temperature determined by an outside temperature sensor is not used as reference temperature but instead there is used a theoretical mean outside temperature stored at specific scanning times of a calendar year. Said theoretical mean outside temperature is stored in the form of a characteristic diagram in a non-erasable memory for one or several climate zones. By correction of the stored values of the theoretical mean outside temperature particularly on the basis of the thermal load of the system determined via the rate of heating or cooling of the heat or cooling source as well as perhaps the correction of the daily course of the outside temperature on the basis of likewise stored values the rated temperature of the heat or cooling source can be so controlled that it corresponds to the actual outside temperature conditions without requiring an outside temperature sensor. With regard to its construction, installation and putting it into operation as well as from the economic point of view the apparatus is particularly advantageous.

61 Claims, 9 Drawing Sheets

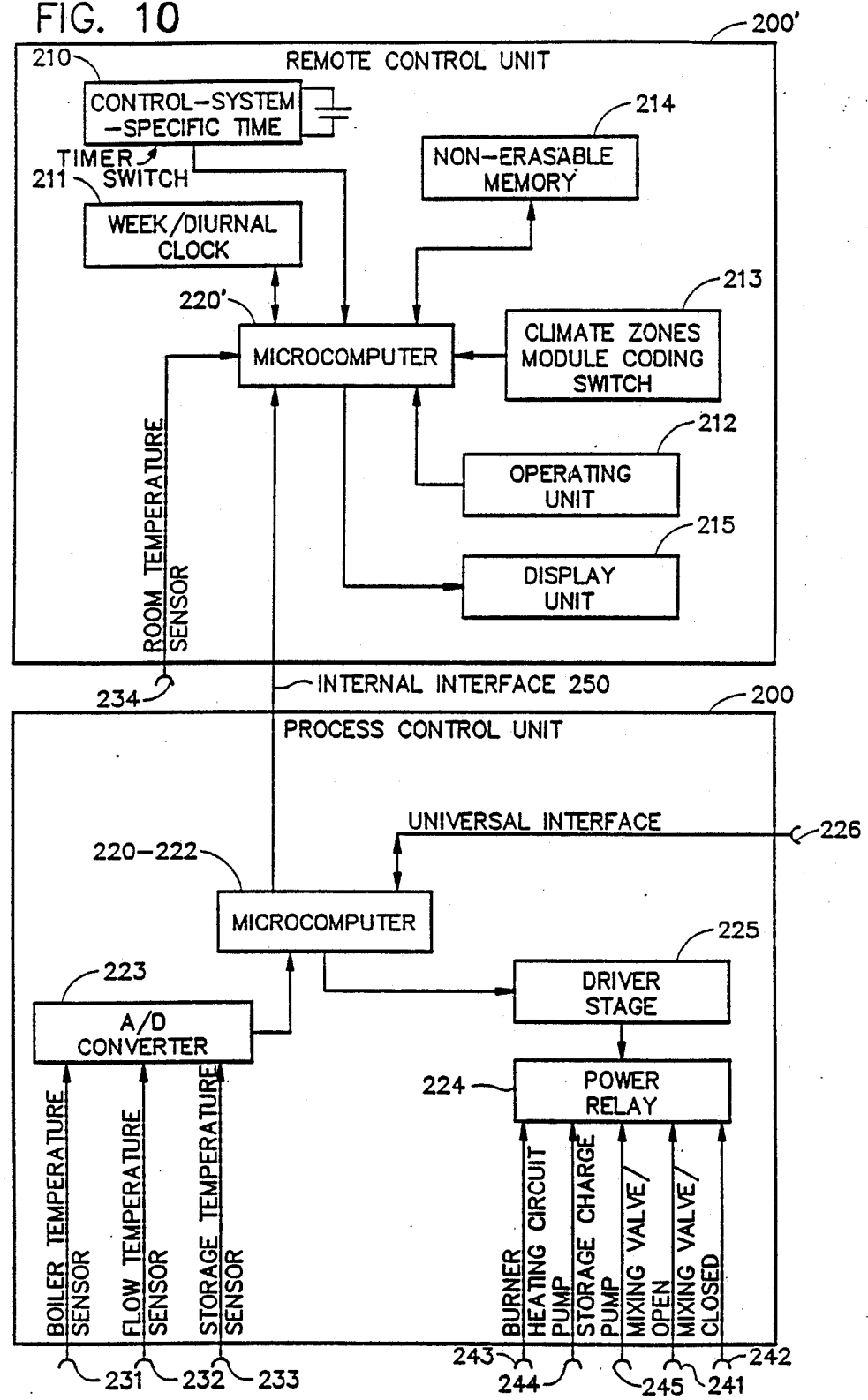

METHOD AND APPARATUS FOR TEMPERATURE CONTROL OF HEATING AND COOLING PLANTS

The present invention relates to a method and apparatus for controlling temperatures of heating or cooling and air-conditioning plants having a heat and cooling source of variable and adjustable temperature, preferably based on an electronic microprocessor-controlled control system.

Heating systems having a heat source which provide a fluid, particularly liquid or gaseous, heat transfer medium of variable temperature for heating radiators, heat exchangers, or other objects, that is to say, particularly heating boilers with oil or gas burners whose rated temperature is controlled according to the outside temperature, have been known for a long time. An Example of a heretofore known heating system particularly for buildings is shown schematically in FIG. 8. Boiler 11, including heating circuits 19 and 20, each for a separate heating fluid, serves as a central heating source and is fired by burner 14, particularly a gas burner or an oil burner. Heating storage tank 12 is heated by the heating fluid flowing through heating circuit 20 via storage charge pump 13. The heating fluid within heating circuit 19 flows through mixing valve 15 (three- or four-way type) and is mixed therein with cold heating fluid flowing through radiator 17 via circulation pump 16.

The temperatures of boiler 11, heating storage tank 12 and upstream radiator 17 are measured by temperature sensors $T_{11}$, $T_{12}$ and $T_{18}$ respectively. The signals $\zeta_{11}$, $\zeta_{12}$ and $\zeta_{18}$ provided by temperature sensors $T_{11}$, $T_{12}$ and $T_{18}$, respectively are fed to a control unit (not shown) and used for determination of control parameters for the control of the operation of burner 14, storage charge pump 13, circulation pump 16 and for the state of mixing valve 15. Control signals S13, S14, S15/OP, S15/CL and S16 provided by the control unit are used for these operational controls.

It is evident that FIG. 8 only shows an exemplified scheme for known heating systems and that many variations of this heating system are possible and known in the art. However, these so-called outside-temperature-guided heating systems with "sliding" control of the rated temperature of the heating boiler and of the flow temperature according to a three- of four-way mixing valve have numerous disadvantages, including particularly the necessity of having to install an outside temperature sensor. This can be associated with substantial structural and financial expenditure particularly in old buildings, especially since there is required a conduit to the corresponding heating regulator which usually is provided in the vicinity of the heat source. A further disadvantage is that the rated temperature of the heat source is basically controlled according to the outside temperature at a given time while individual living and heating habits, i.e., the selection of specific heating times, the ventilation of rooms, etc., cannot be taken into account. Furthermore, the corresponding control units are structurally costly because of the outside temperature sensors. In addition, the heat required in the heating system at any given time and the effective heat reduction have not been taken into account heretofore in the control of the rated temperature of the heat source.

Disadvantages similar to those of the above-described heating systems are also encountered in cooling systems and air conditioners, either stationary or mobile or installed in vehicles, in which an outside-temperature guide of the rated temperature of the cooling source is provided. Heretofore, in these cases there was also required an outside-temperature sensor involving a corresponding expenditure for conduits, installation and control and this is particularly costly for vehicles in which these units are installed subsequently. The additional fact that the actual cooling requirement and the actually required cooling capacity have not been taken into account heretofore in the control of the rated temperature of the cooling source must also be considered.

It is the aim of the present invention, while avoiding the above-mentioned disadvantages of the prior art, to provide a method and an apparatus for the temperature control of centralized and decentralized heating plants having a heat or cooling source of variable and adjustable temperature, preferably with microprocessor control, by means of which the rated temperature of the heat or cooling source can be controlled without outside-temperature sensors while individual living and heating habits and the heat or cooling requirement of the system at any given time can be automatically taken into account at the same time.

There is accordingly provided in accordance with the present invention a method for the temperature control of centralized and decentralized plants having a heat source of variable and adjustable temperature from which heat is removed (a) via a closed circulation of a fluid heat transfer medium, said circulation being connected to the forward and return flow of the heat source, or (b) via an open conduit system with particularly a gaseous heat transfer medium, said heat being supplied to radiators, heat exchangers or other objects to be heated which are heat consumers. The method is based on the control of the temperature of the heat source according to a rated temperature which is regulated as a function of a reference temperature which is variable with time. The method is characterized in that the rated temperature of the heat source is regulated without reference to the actual outside temperature according to a given characteristic corresponding to specific calendar dates. Additionally the rated temperature of the heat source can be required according to theoretical mean outside temperatures of the climatic zone in which the heating plant is located, said theoretical mean outside temperature being additionally assigned to specific times of the day.

There is further provided according to the present invention a method for controlling temperatures of centralized and decentralized cooling and air-conditioning plants having a cooling source of variable and adjustable temperature to which heat is supplied (a) via a closed circulation of a fluid transfer medium, said circulation being connected to the forward and return flow of the cooling source, or (b) via an open conduit system with particularly a gaseous heat transfer medium, said heat being removed from coolers, heat exchangers and other objects to be cooled which are heat sources for cooling. The method is based on the control of the temperature of the cooling source according to a rated temperature which is regulated as a function of a reference temperature which is variable with time. The method is characterized in that the rated temperature of the cooling source is regulated, without reference to the actual outside temperature, by means of a given characteristic according to specific calendar dates. Additionally the rated temperature of the cooling source can be regulated according to theoretical mean outside temperatures of the climatic zone in which the cooling plant is located, said mean theoretical outside temperature being additionally assigned to specific times of the day.

The two basic methods according to the present invention for the temperature control of heating and cooling plants are preferably carried out with an electronic control system with a microcomputer having a central processing unit (CPU), a random access memory (RAM) and at least one non-erasable memory and, when required, an E/A interface and with the use of temperature snesors for determining the actual temperature of the heat or cooling source and, when required, the actual temperature of heat and cold consumers of walls and/or of room air.

The apparatus according to the present invention which carries out this method comprises basically a device for controlling the temperature of the heat or cooling source according to a variable and adjustable rated temperature and a device for controlling the rated temperature of the heat or cooling source as a function of a reference temperature that is variable with time. Said apparatus is characterized in that the device for controlling the rated temperature of the heat or cooling source (A) controls the rated temperature of the heat or cooling source by means of a predetermined characteristic according to specific calendar dates and, when required, additionally to theoretical mean outside temperatures of the corresponding climatic zone in which the heating and/or cooling plant is located, said theoretical mean outside temperatures being assigned to specific times of the day, and that it has (B1)—at least one non-erasable memory in which the characteristic or discrete individual values of the theoretical mean outside temperature and/or the characteristic or discrete individual values of the rated temperature of the heat or cooling source obtained in a given case on the basis of the theoretical mean outside temperature. As an alternative the non-erasable memory stores additionally corresponding correction values for predetermined points of time of a calendar year and times of the day for one or several climate zones.

The device for controlling the rated temperature of the heating or cooling source further includes a device for scanning and reading-out the characteristics and pairs of discrete values which are stored in the non-erasable memory and are used at the predetermined scanning times for the control of the rated temperature of the heat or cooling source, and, as an alternative, additionally a device for reading-in the corresponding characteristics and discrete individual values in the non-erasable memory.

As a further alternative the device for controlling the rated temperature of the heating or cooling source includes a device for receiving or scanning data or values of the theoretical mean outside temperature and/or of the resulting rated temperature of the heat or cooling source and as a further alternative additionally receives corresponding correction values from an external data bank or a remote control device for controlling the rated temperature of the heat or cooling source.

Said device for controlling the rated temperature of the heat or cooling source includes as a further alternative a device for the feedback of temperature and/or reference variables to an external data bank or control device.

The non-erasable memory of the apparatus according to the present invention can be constructed as a mechanical memory, particularly in the form of cam plates that can be scanned mechanically, electrically or electronically and are provided with a synchronous drive, or by conventional discrete electronics with analog or digital circuits. Preferred memories are ROMS, PROMS, EPROMs and EEPROMs.

Furthermore, the apparatus according to the present invention can also be constructed on the basis of gate arrays or contain gate arrays as essential logic components.

A preferred apparatus according to the present invention is so designed that at least the device for controlling the rated temperature of the heat or cooling source has a microcomputer with a central processing unit (CPU), a random access memory (RAM), at least one non-erasable memory, and when required, an E/A interface. Furthermore, temperature sensors for determining the actual temperature of the heat or cooling source and, when required, of the heat consumers or cold consumers (heat suppliers) of walls and room air.

A particularly favourable compact apparatus is characterized by a control and regulating unit with a microcomputer with a central comproccessing unit (CPU), a random access memory (RAM) and a non-erasable memory for storing theoretical mean outside temperatures assigned to calendar dates and, as an alternative, times of the day for one or several climate zones.

Said non-erasable memory can further store correction values for the theoretical mean outside temperatures, corrected values of the theoretical mean outside temperatures, rated values of the heat or cooling source, correction values of the rated temperatures of the heat or cooling source, rated temperatures for day, night and frost protection operations, calibration values of control unit parameters and corresponding data values called in or received from an external data bank or control device.

The control and regulating unit carries out substantially the following operations:

processing the input data time-controlled or timer-controlled scan of the stored theoretical mean outside temperature and as an alternative, additionally of correction values or of stored rated temperatures at predetermined scanning times.

In an alternative version the control and regulating unit carries out the following operation:

reception of or calling in corresponding data values from an external data bank or control device, with storage or intermediate storage, determination of the rated temperature of the heat or cooling source or of the fluid heat transfer medium as a function of the respective calendar date. As an alternative the control and regulating unit carries out additionally determination of the theoretical mean outside temperature of the climate zone concerned at specific predetermined scanning times, said theoretical means outside temperature being assigned to the respective time of the day.

As an additional feature the control and regulating unit carries out the operation of:
correction of the rated temperature of the heat or cooling source obtained on the basis of the theoretical mean outside temperature for the predetermined scanning times,
control of the control system of the heat source after data conversion,
comparison of the rated and actual temperatures,
selection of relays and/or actuators as a function of the rated and actual temperatures according to predetermined fixed or discretionary control unit characteristic,
and, as an alternative feature operates one or several interfaces carries out data conversion of data from
an A/D converter for the A/D conversion of the analog output signals of the temperature sensors and operates
driver units for relays and/or actuators and one or several relays and/or actuators for the selection of the heat production device of the heat source and of the cold production device of the cooling source, particularly of burners in heating boilers, of mixing valves, circulation pumps, control valves and/or storage charge pumps.

A preferred embodiment of the apparatus according to the present invention for the temperature control of centralized and decentralized heating and cooling plants having
a heat or cooling source of variable and adjustable temperature, from which heat is removed or supplied via a closed circulation of a heat transfer medium connected to the forward and return flow of the heat or cooling source or via an open conduit system with particularly a gaseous heat transfer medium,
said heat being supplied or removed for cooling from radiators or cooled, heat exchangers or other objects to be heated or coolers as heat consumers or heat suppliers comprises
an electronic control system having a microcomputer with a central processing unit (CPU), a random access memory (RAM), at least one non-erasable memory and, when required, an E/A interface and
temperature sensors for determining the actual temperature of the heat or cooling source and, when required, of heat consumers or of objects to be cooled, of walls and/or room air consists of two separate components, each component being "intelligent" due to microprocessor control.

A preferred embodiment of the apparatus is characterized by the control and regulating unit being divided in
(A) a remote control unit preferably independent of the heat or cooling source and having
a first microcomputer with first central processing unit (CPU), a first random access memory (RAM) and a first non-erasable memory for storing
calendar dates, theoretical mean outside temperatures for one or several climate zones assigned to times of the day,
correction values for the theoretical mean outside temperatures,
corrected values for the theoretical mean outside temperatures,
rated temperatures of the heat and cooling source,
correction values of the rated temperature of the heat or cooling source,
rated temperature for day, night and frost protection operation,
calibration values of the control system parameters, and corresponding data values called in or received from an external data bank or control unit
which substantially carries out the following operations:
processing the input data,
time-controlled or timer-controlled scan of the stored theoretical mean outside temperatures and the correction values or stored rated temperatures at predetermined scanning times
reception or call-in of corresponding data values from an external data bank or control device, when required with storage or intermediate storage,
determination of the rated temperatures of the heat or cooling source or of the fluid heat transfer medium as a function of the respective calendar data and additionally of the theoretical mean outside temperature of the climate zone concerned at specific predetermined scanning times, said theoretical mean outside temperature being assigned to the respective time of the day,
correction of the rated temperature of the heat or cooling source obtained on the basis of the theoretical mean outside temperature for the predetermined scanning times and
control of the control system of the heat source, when required, after data conversion and via an interface,
of an interface to a control system, and
(B) a process control unit for the temperature of the heat or cooling source, said control system being provided on or at the heat or cooling source with
an interface for the data transfer between control system and control unit,
an A/D converter for the A/D conversion of the analog output signals of the temperature sensors
a second microcomputer with a second central processing unit (CPU), a second random access memory and a second non-erasable memory which carries out the following operations:
comparison of the rated and actual temperatures,
selection of relays and/or actuators as a function of the rated and actual temperatures according to predetermined fixed or discretionary control system characteristic,
operation of the interface for the control unit and data conversion for the interfaces,
driver units for relays and/or selection units for actuators and
one or several relays and/or actuators for the selection of the heat production device of the heat source and of the cold production device of the cooling source, particularly of burners in heating boilers, of mixing valves, circulation pumps, control valves and/or storage charge pumps.

The inventive idea thus is based on the fundamental principle of carrying out a quasi-sliding control of the rated temperature of the heat or cooling source in accordance with the outside temperature on the basis of data for the theoretical mean outside temperature on specific calendar days and, as a alternative additionally specific corresponding times of the day, these data being stored in a non-erasable memory. For this purpose corresponding characteristic curves and data records for the theoretical mean outside temperature are relative to several climate zones, preferably four climate zones. Furthermore, the rated temperature of the heat or cooling source is controlled time-proportionally or with a discretionary lead of hysteresis relative to a theoretical mean outside temperature, which can be corrected additionally according to the time of the day and/or to other criteria.

The most important correction in this case lies in taking into account the time temperature gradient of the actual temperature of the heat source when heating up, i.e., of the rate of heating or cooling, which is taken into account as corresponding correction parameter in the control of the rated temperature of the heat and cooling source. In this manner a predetermined rated-value curve of the temperature of the heat or cooling source can also be correspondingly varied without room temperature sensor as a function of differently determined heat or cooling requirement of the system or of the heat or cold supplied to the consumer.

The invention will be explained hereafter in greater detail with reference to the drawings, which relate to heating as well as to heating plants as far as they concern the method according to the present invention and the apparatus according to the present invention. However, the invention idea also is equally applicable to cooling and air conditioning plants.

BRIEF DESCRIPTION OF THE DRAWINGS

FIG. 10 is a schematic illustration of a further embodiment of an apparatus in accordance with the present invention.

Figure 1:
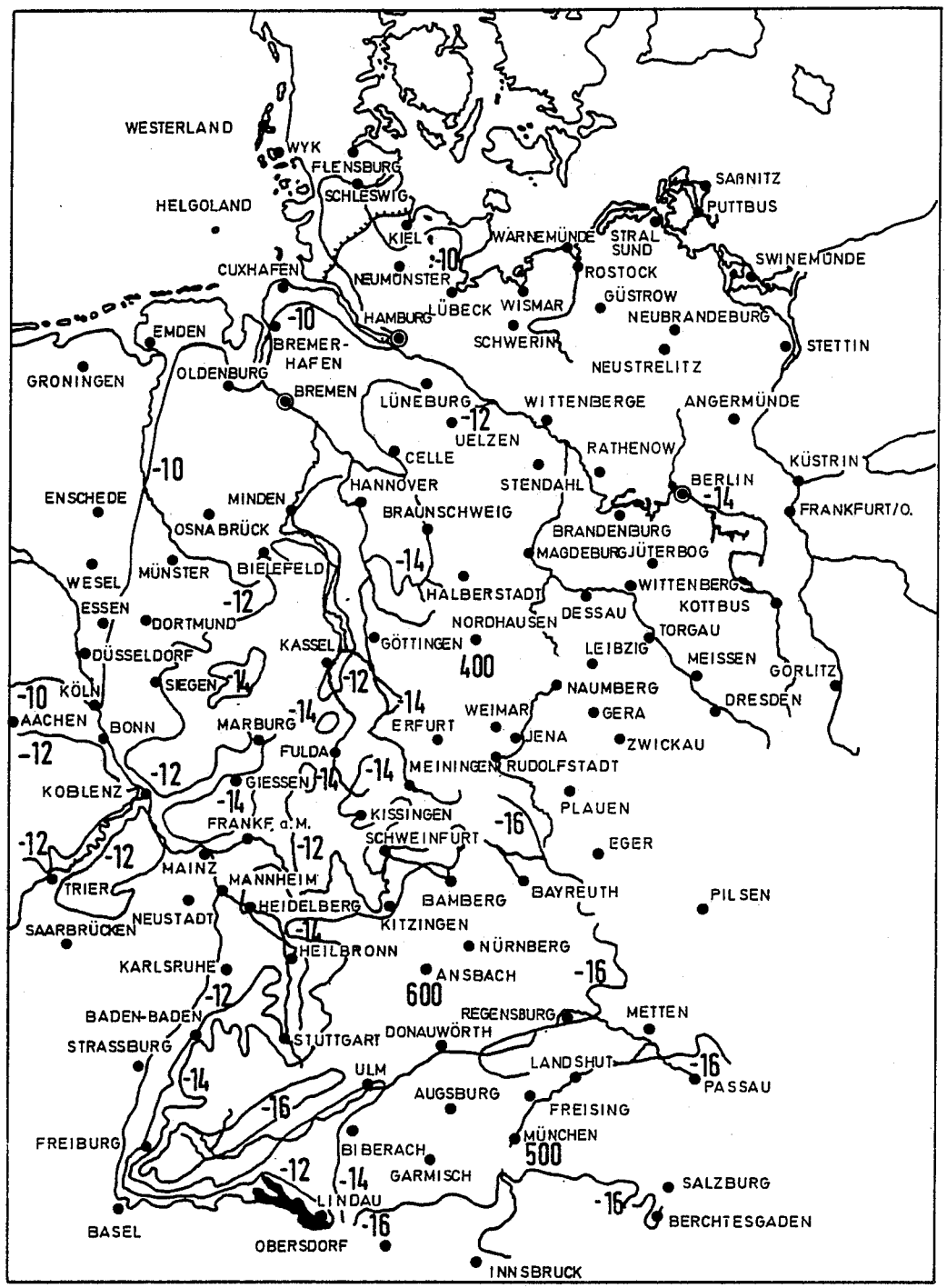
FIG. 1 is an isothermal map of the Federal Republic of Germany.

The present invention is based on the fundamental assumption that the geographical regions in which heating or cooling or air conditioning plants of the underlying type are installed or are to be installed can be divided into several climatic zones. The number of climate zones required for taking into account different climatic conditions is very small; for example, for Germany four climatic zones are adequate. The corresponding conditions are shown in FIG. 1. An isothermal map of the Federal Republic of Germany is shown (DIN 4701, part 2, page 17), with the lowest two-day mean of the air temperature in °C. (relative to ten occurrences in 20 years in the period from 1951 to 1970) as parameters. Four climatic zones can be seen in FIG. 1, namely with a lowest, two-day mean of the air temperature of $-16°$, $-14°$, $-12°$ and $-10°$ C.

The inventive idea is based on the fact that for each climatic zone selected the pattern of the theoretical mean outside temperature during a calendar year, which is quite generally available from published meteorological data, is stored in a non-erasable memory, particularly of a microprocessor system and is used for controlling the rated temperature of the heat and cooling source, permitting also a combination of several climatic zones, instead of the outside temperature values conventionally determined directly with an outside temperature sensor.

The mean temperature pattern of the outside temperature during a calendar year, i.e., the temperature profile for different regions, is the subject of German Industrial Standard DIN 4710.

The temperature profile representing the climatic zone concerned, i.e., the temperature profile of the theoretical mean outside temperature for all the calendar days or scanning times of a calendar year, is so determined that first an allocation to a climatic zone is made, whereupon a theoretical mean curve is plotted from existing individual curves of the mean outside temperature and available minimal and maximal values. According to the present invention said theoretical mean curve is then used as relevant temperature profile for the corresponding climatic zone for the control of the rated temperature of the heat or cooling zone.

Figure 2:
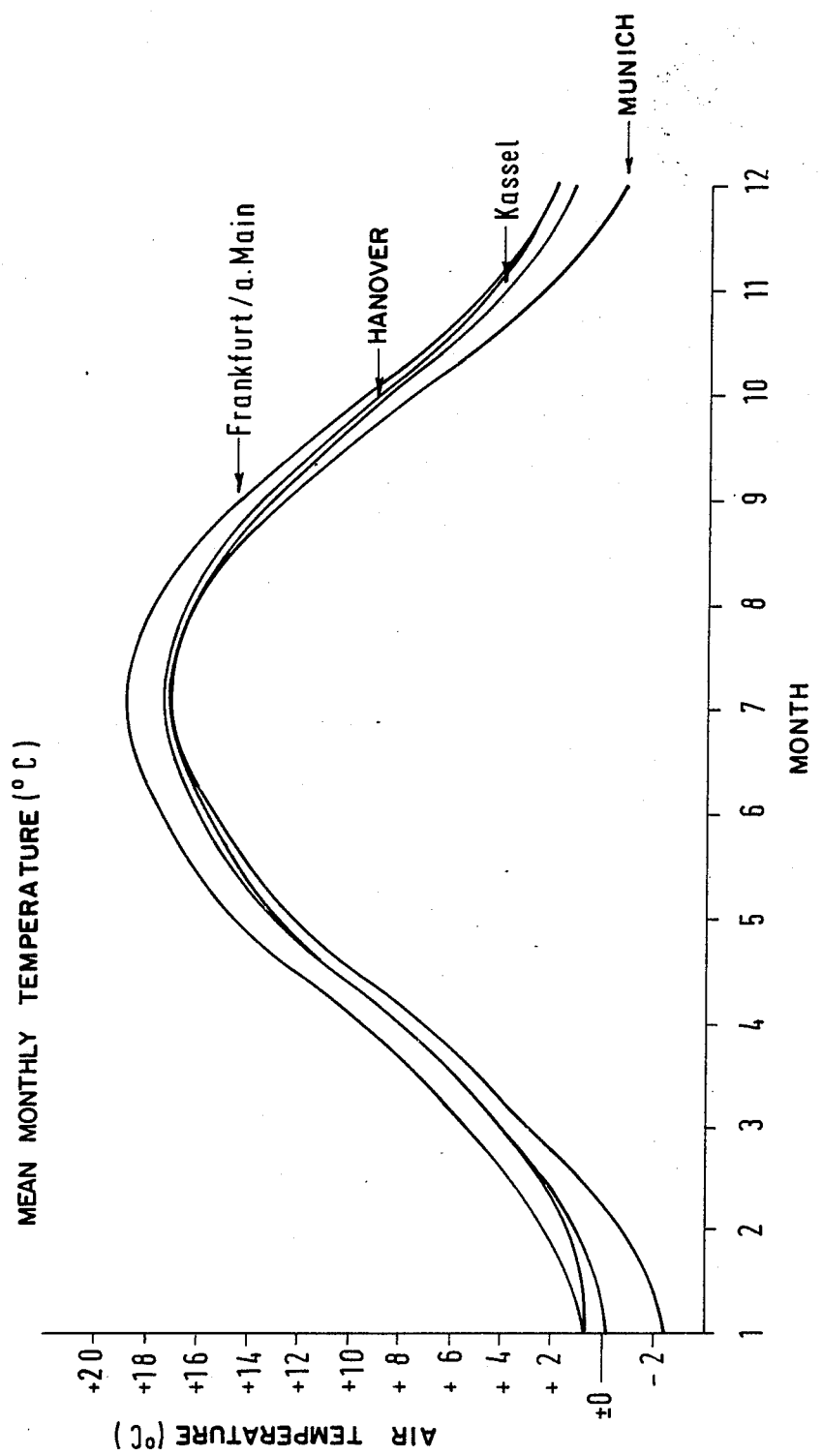
FIG. 2 is a graph showing the average monthly temperature for Frankfurt am Main, Hanover, Kassel and Munich.

FIG. 2 shows the pattern of the air temperature (average monthly temperature) during a calendar year for four different German cities (Frankfurt am Main, Hanover, Kassel and Munich). It is evident that in all the cases the characteristic of the mean outside temperature (air temperature) is substantially the same and that there occurs merely a shift in the direction of the temperature axis (ordinate).

The individual curves of the mean outside temperature, assigned to specific climatic zones, as a function of the calendar data are correspondingly stored as theoretical mean outside temperatures and are used to control heating and cooling.

Figure 3:
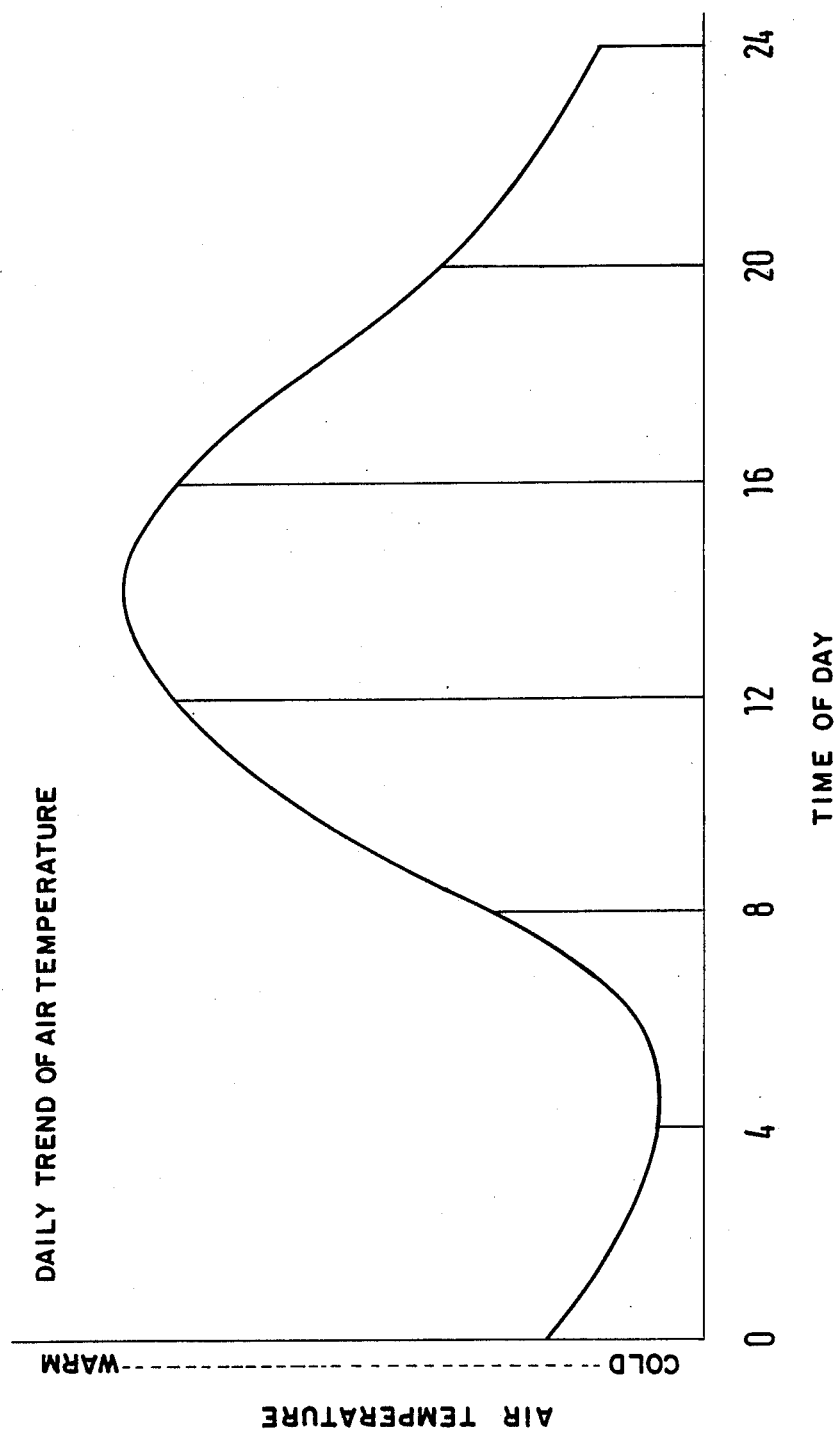
FIG. 3 is a graph showing the outside temperature as a function of the time of day.

The outside temperature (air temperature) is shown diagrammatically in FIG. 3 as a function of the time of the day for a given calendar day. It is known from reliable meteorological data that this mean daily temperature pattern of the outside temperature is practically independent of the calendar date concerned and that in this respect there merely occurs a shift in the direction of the ordinate, i.e., towards higher or lower temperatures. This means that a simple correction of the effect of the daily trend of the mean outside temperature can be made since, for example, in the time from approximately 10.00 a.m. to approximately 4.00 p.m. an increase in the outside temperature must be expected so that, for example, when the stored data values of the theoretical mean outside temperature are relative to the time of 10.00 a.m. a simple, e.g., additive, correction of this theoretical mean outside temperature during the noon hours up to approximately 4.00 p.m. is possible. A further distinction can also be made with regard to seasonal differences such as so-called meteorological singularities, as for example, sudden onset of cold weather during the sheep shearing period in June, cold spells in the middle of May, etc. The values of the theoretical mean outside temperatures corrected, for example, by means of the characteristic of the daily trend of the mean outside temperature, are used for the control of the rated temperature of the heat or cooling source. The correction values and/or the corrected values themselves can also be stored in a non-erasable memory.

Figure 4:
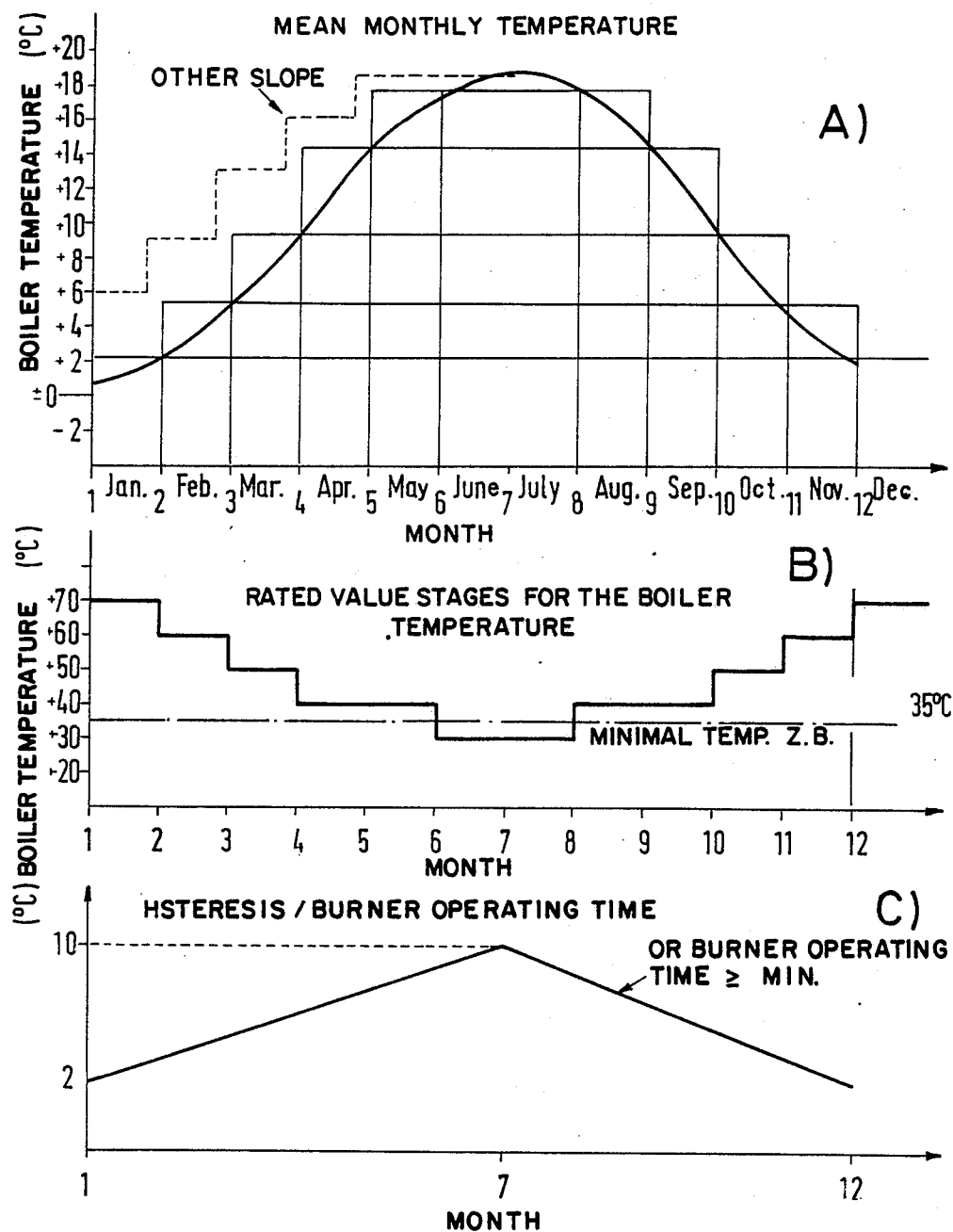
FIG. 4A is a graph showing the mean monthly temperature during a calendar year.
FIG. 4B is a graph showing the assignment of the temperature of a heat source during a calendar year.
FIG. 4C is a graph showing the hysteresis of the rated temperature of a boiler as a function of temperature profile.

By means of the respective temperature profiles corresponding rated temperature curves are plotted for the individual climate zones, as represented diagrammatically in FIG. 4.

The pattern of the mean monthly temperature during a calendar year is shown in FIG. 4A for a specific climate zone. The pattern (thick continuous lines) is approximately by a step-like curve whose number of temperature steps fixes the minimal time interval for the corresponding rated value variation of the rated temperature of the heat or cooling source, a gradual approximation to the temperature zone of the climate zone taking place correspondingly. As is immediately evident, the dashed step-like curve corresponds to another slope of this kind of approximated rated-value curve, like that stored according to the present invention in a non-erasable memory, particularly in the form of pairs of values.

FIG. 4B shows the assignment of the temperature of a heat source, using the example of the boiler temperature of a heating boiler at the corresponding calendar date taking into account the rated value curve of FIG. 4A. The boiler temperature is based, for example, on rated value stages of 10° C. Furthermore, a minimal temperature of, e.g., 35° C. has been assumed.

Of course, within the scope of the present invention it is possible to use rated-value steps of varying height depending on the season or calendar date, the minimum height of that rated value step depending particularly on the technological and heating-technological conditions of the heat or cooling source.

The hysteresis of the rated temperature of a heating boiler or the burner operating time is represented diagrammatically in FIG. 4C as a function of the temperature profile of a given climatic zone.

Heat requirement and heat decrease in a heating or cooling system vary depending on the season.

At a constant hysteresis varying burner operating times are obtained. In the extreme case they are so short that no satisfactory combustion (high proportion of deleterious substance) is assured and, for example, the proportion of the deleterious substance in the flue gas also is high. Optimal combustion values are obtained at longer operating times, for example, at operating times longer than or equal to 4 minutes. Because of the fact that a variable hysteresis is allowed as a function of the season, i.e., of the heat requirement, a burner operating time longer than or equal to 4 minutes is also obtained when the heat decrease is lower. An optimal combustion low in deleterious substance thus is obtained. As mentioned above a room temperature sensor is not essential. However, when a room temperature sensor is provided an additional correction of the values of the theoretical mean outside temperature on which the control of the rated temperature of the heat or cooling source is based becomes possible, as is shown diagrammatically in FIG. 5 for the example of the boiler or flow temperature of a central heating system.

The dashed step-like curve corresponds to the maximal temperature increase caused by the output signal of a room temperature sensor. However, the downward correction of the rated value is discretionary and the minimal temperature is, for example, once more 35° C.

Figure 6:
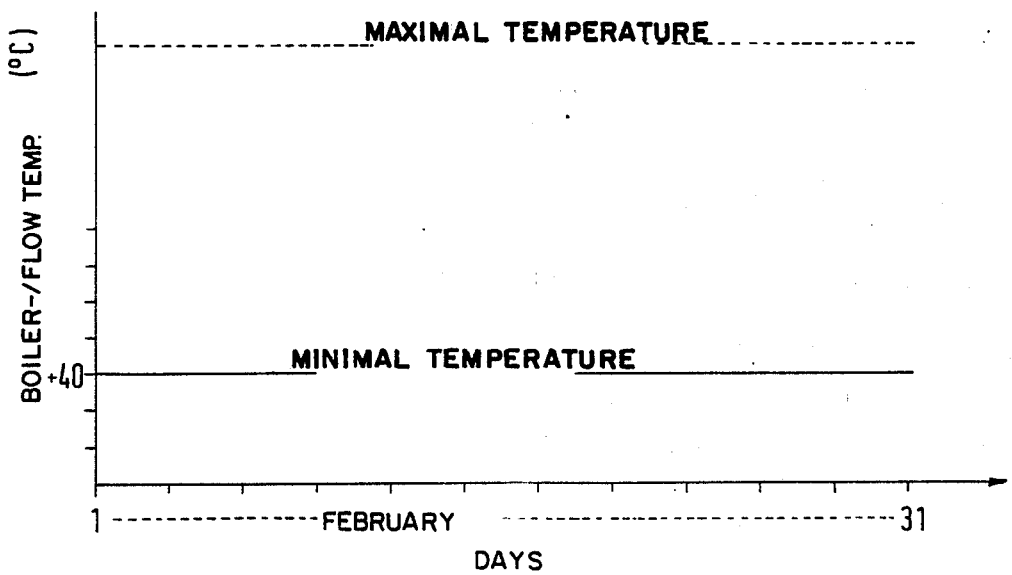
FIG. 6 is a graph showing a simplified case of the correction of the values of the theoretical mean outside temperature.

FIG. 6 shows the simplified case, which at the same time is entirely adequate in practice, i.e., that for a given month (February) a constant rated value for the temperature of a heat source (example: boiler temperature of a heating boiler or a corresponding flow temperature) is assumed, the lower continuous line at +40° C. corresponding to the minimal temperature and the upper broken line corresponding to the maximal value of the rated temperature of the heat source based on a correction via a room temperature sensor.

Within the scope of the present invention it is of course also possible to provide varying mean rated temperature of the heat source and/or even corresponding varying correction values within a month, for example, for individual calendar days within a calendar year.

Figure 7:
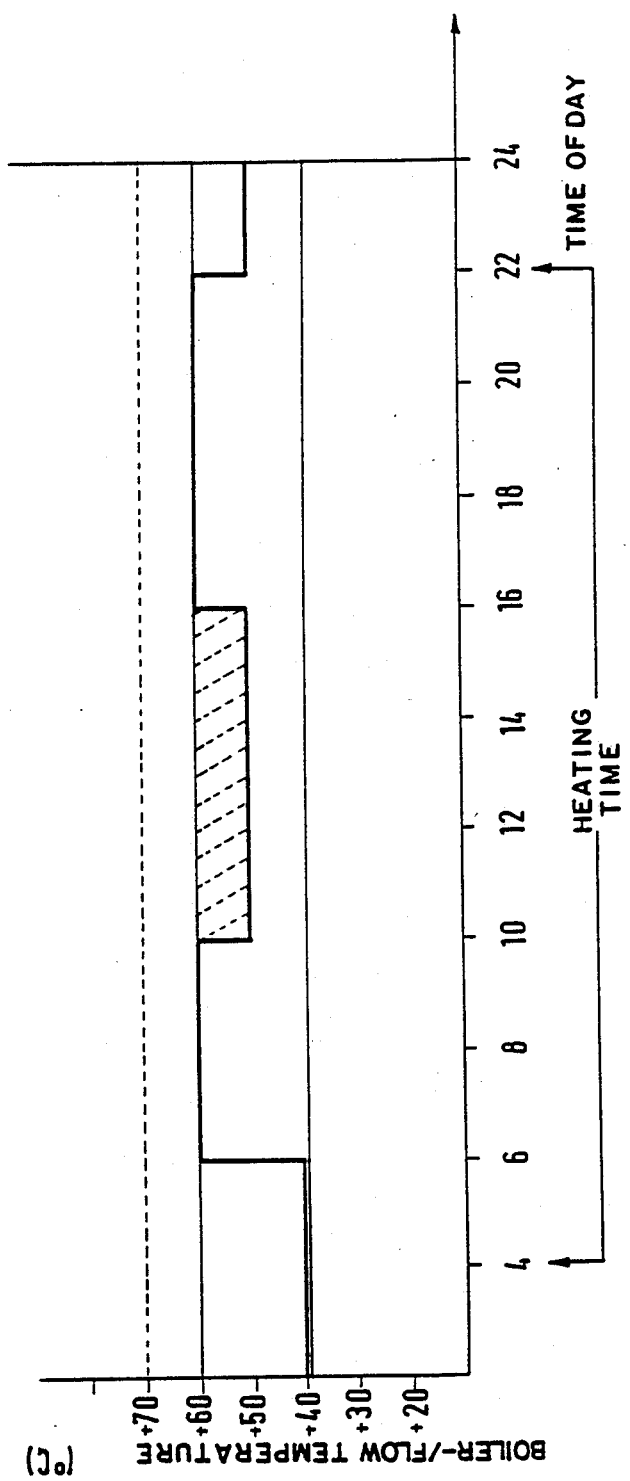
FIG. 7 is a graph showing the pattern of the heat source temperature during one day.

Finally FIG. 7 shows the pattern of the temperature of the heat source (boiler temperature or flow temperature) during a specific day, the normal day operation being between 6 a.m. and 10 a.m. and, as explained hereinbefore, the operation is reduced between 10 a.m. and 4 p.m. with regard to the temperature because of the diurnal variation of the mean air temperature and the reduced operation changes again to the normal day operation from 4 p.m. to 10 p.m., followed by the reduced night operation between 10 p.m. and 6 a.m.

Figure 8:
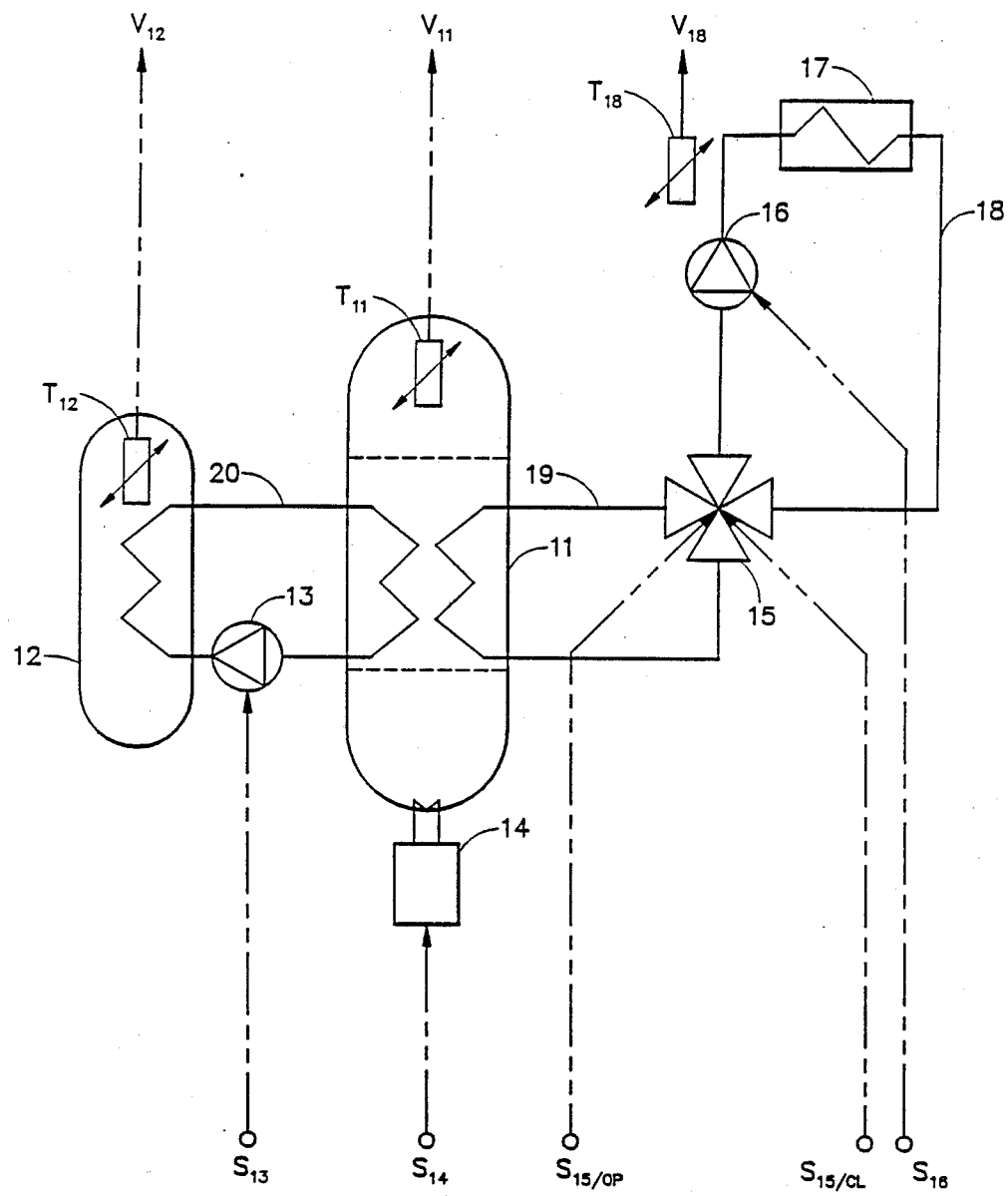
FIG. 8 is a schematic view of an exemplified prior art heating plant for buildings.

The present invention generally relates to the assumption of a rated temperature for a heat source or a source which is based on a stored information based in turn on a mean theoretical outside temperature that is derived from meteorological data. The stored information is preferably corrected according to the actual requirement of heat or cold of the system and the corrected outside temperature values practically correspond to the actual outside temperatures without requiring an outside temperature sensor. The invention can be applied to or used with a heating system as it is exemplified by FIG. 8.

Within the scope of the present invention not only are heating boilers with gas or oil burner or heating boilers fired with solid fuels suitable as heat sources but also alternatively additionally for central heating systems with three- or four-way mixers, which are controlled via the mixer drive, the system heating boiler/mixing valve which, in that case, represents the actual heat source.

Further suitable heat sources are liquefiers of heat pumps or heat pump systems that are designed as heat exchangers, the control being carried out by means of the speed or the operating time of the compressor and/or a control valve provided in the liquefier circuit and/or the heating and/or cooling-side throughput of the heat transfer medium in or at the heat exchanger and/or by switching units on or off.

The heat accumulator of an electric storage heater is another suitable heat source whose temperature is being controlled, the control being carried out via the throughput of the heat transfer medium or the operating time at intermittent throughput of the heat transfer medium.

Furthermore, heat sources whose temperature is controlled can be electric heating resistors, the control being carried out via the electric heating capacity, particularly by thyristor control and/or the throughput of the heat transfer medium and/or the operating time, as well as heat accumulators based on a storage liquid, a rock or ceramics fill or a salt solution, the control being carried out via the throughput of the heat transfer medium, when required in a heat exchanger and/or via the operating time at intermittent throughput of the heat transfer medium.

Cooling sources suitable according to the present invention, i.e., devices consuming heat or removing heat from a heat transfer medium, are, for example, evaporators of compression or absorption refrigerating machines, the evaporators being designed particularly as heat exchangers. In the case of the compression refrigerating machines the control is carried out via the speed or the operating time of the compressor and/or a control valve provided in the evaporator circuit and/or the heating- and/or cooling-side throughput of the heat transfer medium in or at the heat exchanger and/or by switching units on or off and in the case of the absorption refrigerating machine via the boiler capacity and/or a control valve provided in the evaporator circuit and/or a control valve provided in the absorber circuit and/or the heating and/or cooling side throughput of the heat transfer medium in or at the heat exchanger.

Other suitable cooling sources whose temperature is controlled are, for example, Peletier elements designed as heat exchangers or Peletier elements connected to a heat exchanger, the control being carried out via the electrical power and/or the heating side and/or the cooling side throughput of the heat transfer medium at the corresponding heat exchanger and/or the sources are conventional cold accumulators, the control being carried out via the throughput of the heat transfer medium, when required in a heat exchanger, and/or the operating time at intermittent throughput of the heat transfer medium.

Fluid heat transfer media are particularly water, organic solvents, high-boiling hydrocarbons, aqueous and/or organic solvents or antifreezes and/or anticorrosives, gases and gas mixtures such as air, ammonia gas, carbon dioxide, fluorinated and perfluorinated hydrocarbons, particularly Frigens and Freons.

The correction of the data values of the theoretical mean outside temperature stored in the non-erasable memory can be corrected additively, multiplicatively by means of an exponential process with correction values or group of curves which have also been stored. The correction values and the resulting corrected temperature values used for the control of the rated temperature of the heat source can also be stored in a non-erasable memory.

Since the actual outside temperature does not exactly correspond to the stored theoretical mean outside temperature, a correction of the stored theoretical mean outside temperature and of the resulting rated temperature used for the control of the rated temperature of the heat or cooling source is required. This control is carried out via the time-temperature gradient of the heat and cooling source, i.e., its heating and cooling rates, since they correspond to the heat and cooling requirement of the system concerned and a correction of the theoretical mean outside temperature thus is possible on the basis of a parameter which is directly relative to the actual outside temperature since the heat or cooling requirement of a heating or air conditioning system under given structural conditions depends particularly on the actual outside temperature. However, since in most cases the control system is attached directly to the heat or cooling source itself, particularly a heating boiler, and since its temperature is determined by a temperature sensor in any case, the information of the heating and cooling rate as the time-temperature gradient is available as an input variable.

The problem that on some calendar days the theoretical mean outside temperature is not in agreement with the actual temperature is solved in this manner since a rated temperature of the heat or cooling source which corresponds to the actual temperature conditions is computed nevertheless.

In the case of heat sources instead of the heating rate of a heating boiler, even when the heating boiler is operated with a specific adequate temperature, the flow temperature of the heating system according to a manually or electronically operated three- or four-way mixing valve can be used as information on the heat requirement of the heating system, even when the heating system is in a quasistationary state, via the position of the mixing valve or also by thermostat valves, for example, by means of a potentiometer provided thereon.

Just in the same way the heat requirement of a heating system can also be determined by means of the throughput of the heat transfer medium.

In the case of cooling source the rate of cooling of the cooling source can be determined directly by means of a temperature sensor. As an alternative, the cooling rate can also be determined via the position or the keying ratio of control valves, the speed of compressors or compressor drives or the throughput of the heat transfer medium and in the case of Peletier elements also via the operating current.

In all the cases an even physically significant correction value is thus obtained for the theoretical mean outside temperature and the resulting rated temperature of the heat or cooling source. This correction value allows an adaptation of the system to the actual outside temperature.

Within some periods of time of a calendar year there occur so-called climatic and meteorological singularities, as for example, the sudden onset of cold weather during the sheep-shearing period in June or cold spells in the middle of May. These singularities can also be stored in the form of corresponding correction values for the theoretical mean outside temperature of the time interval concerned and used for the control of the heat or cooling source.

The storage of the data values of the theoretical mean outside temperature and, when required, of the correction values and of the corrected values of the theoretical mean outside temperature and rated temperatures can be carried out within the scope of the present invention in various manners, for example, mechanically, particularly in the form of cam plates for the climate zone concerned which are provided with synchronous drives or clocks and can be scanned mechanically, optically or electronically or by conventional discrete electronic analog and digital circuits with which a microcomputer is quasi-imitated. In the case of microprocessor-controlled systems the storage of the temperature and correction data in the digital form in non-erasable electronic, optical or magnetic memories, most advantageously in ROMs, PROMs, EPROMs or EEPROMs is particularly favourable. At the same time it is favourable to store data combinations in so-called performance graphs since, as compared with a specific computation of values, the reading-out of the corresponding values is possible with very short access times. The application of customer-specific modules, particularly of gate-arrays, also is favourable in many cases. The performance graphs are two- or more-dimensional and particularly three-dimensional, the third dimension being assigned to the corresponding climate zones.

Furthermore, it is favourable when the non-erasable memory is readily replaceable or is disposed in a replaceable unit, particularly in a corresponding plug-in module. Alternatively a corresponding coding of the memory or in the memory can be provided, the coding being assigned to climate zones. On the basis of said coding data values relative to certain climate zones can be read-out and corresponding apparatuses can be readily adapted to the side of application.

Since the thermal efficiency of burners in heating boilers fundamentally is approximately constant and since this also applies to electrically heated heating boilers or to electric heating systems, the control of the temperature of this heat source for a given rated temperature is carried out in a conventional manner by means of the operating time of the corresponding burner. In the case of heating boilers fired with solid fuels the temperature is controlled, for example, via the air supply.

However, in the preparation of industrial water the rated temperature of a heating boiler must be sufficiently above the rated temperature of the industrial water storage tank, usually at approximately 70° C. According to the present invention when requiring industrial water either the control of the rated temperature of the heat source is correspondingly switched off on the basis of the theoretical mean outside temperature and the rated temperature of the heat source is adjusted to a predetermined fixed value, for example, 70° C., or the rated temperature of the heat source obtained on the basis of the theoretical mean outside temperature is so corrected that the predetermined industrial water temperature is reached in the industrial water storage tank.

This also applies analogously to the reduced-night and frost-protection operation. In this case the rated temperature of the heat source is not adjusted upwards but it is corrected towards lower temperature values or adjusted to a lower value.

As compared with the rated temperature the actual temperature of a heat or cooling source shows a hysteresis per unit time which depends on the concrete heating boiler system in each case. According to the present invention the control of the rated temperature of the heat or cooling source can correspondingly be carried with a corresponding preshift per unit time to compensate the hysteresis.

Figure 5:
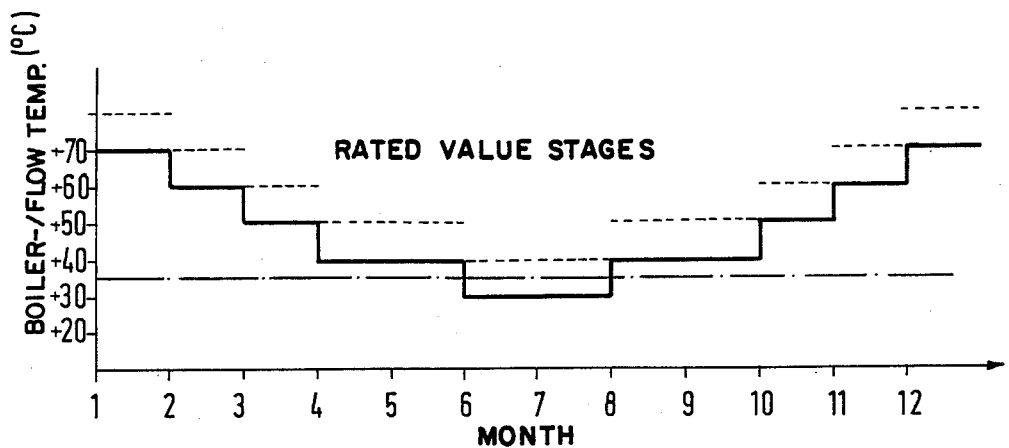
FIG. 5 is a graph showing a correction of the values of the theoretical mean outside temperature.

The minimum time intervals between the scanning times of the theoretical mean outside temperature are preferably fixed on the basis of the steps of the rated temperature of the heat source, as explained hereinbefore with reference to the FIGS. 4 and 5 but the scanning times can also have regular constant time intervals, preferably with very short time intervals. In that case the scoring logic determines in each case whether at the present scanning time a difference in temperature adequate for a change of the rated temperature of the heat source is present at the heat source.

Furthermore, the time intervals between the scanning times of the theoretical mean outside temperature need not be steady and constant during an entire calendar year either but they can have varying constant values within specific time periods of a calendar year.

According to the present invention the use of a "learning" microcomputer system is particularly favourable. On the basis of a learning program said microcomputer system stores the corrected values of the theoretical mean outside temperature and of the effective rated temperature of the heat source, as obtained after the correction, for all the days of a calendar year in a non-erasable memory and uses these updated values for the next operating cycle, particularly for the following calendar year.

Figure 9:
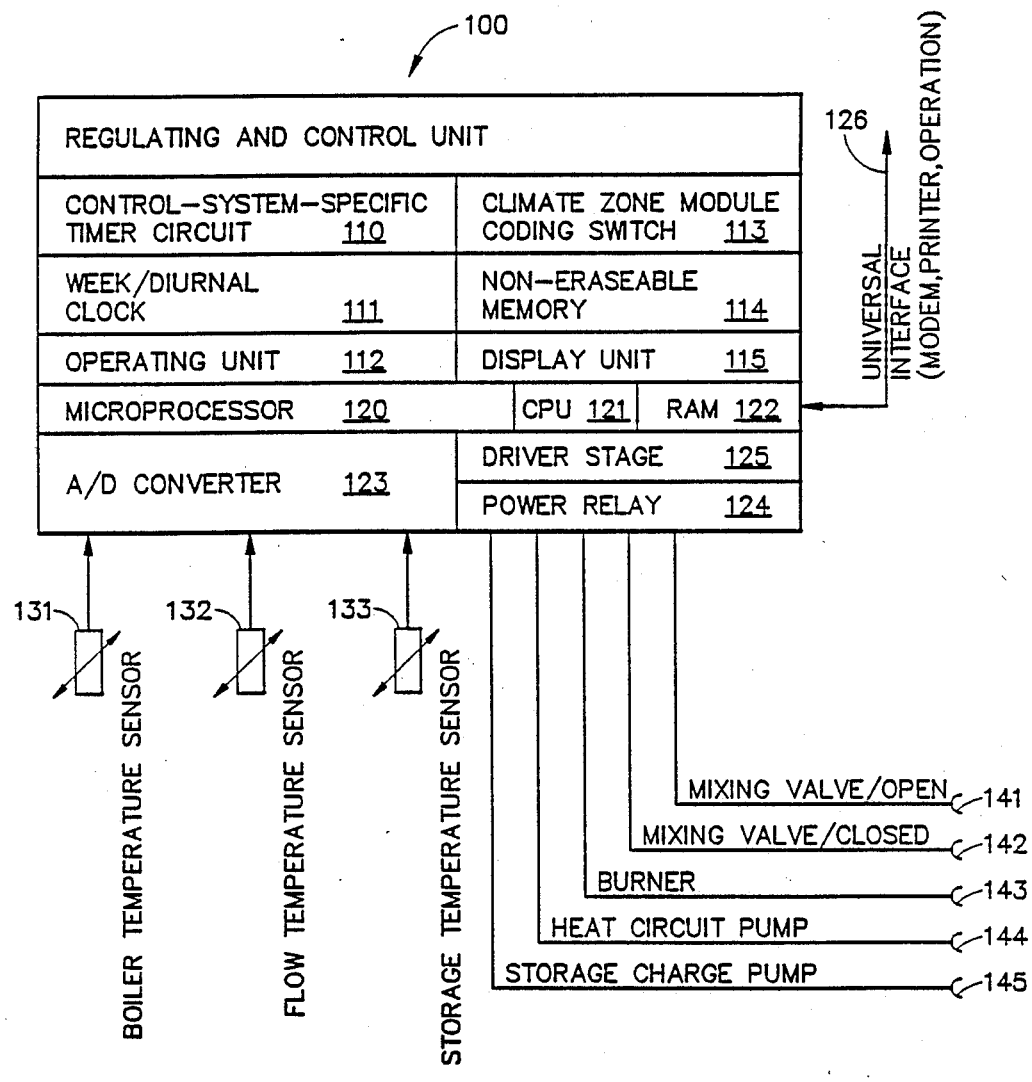
FIG. 9 is a schematic illustration of an apparatus in accordance with the present invention.

An embodiment of a control and regulating unit according to the present invention is shown in FIG. 9 for the example of a heating unit control which is designed as a compact device and is preferably installed at or near the heat source. The control and regulating unit 100 comprises as the most important component a microcomputer 120 having a central processing unit 121 (CPU), a random access memory (RAM) 122 and a non-erasable memory 114 in which there are stored theoretical mean outside temperatures for one or several climatic zones which are assigned particularly to calendar dates and, when required, also to times of the day, and, when required, correction values for the theoretical mean outside temperatures and, when required, corrected values of the theoretical mean outside temperatures as well as rated values for days, night- and frost-protection and calibration values of the control unit parameters since in this embodiment the microcomputer also assumes the control of the heat source in addition to the assumed rated values.

The microcomputer 120 carries out the following operations:
  processing the input data,
  determining the rated temperature of the heat source or of the heat transfer fluid in the heating circuit as a function of the respective calendar date and, when required, theoretical mean outside temperatures of the climate zone concerned at specific predetermined scanning times, said theoretical mean temperatures being assigned to the respective time of the day,
  correcting of the rated temperature of the heat source obtained on the basis of the theoretical mean outside temperature for given scanning times and
  controlling the control system of the heat source, when required after data conversion.

Furthermore, the regulating and control unit 100 also has a control unit-specific timer circuit 110, which presets the scanning times for the theoretical mean outside temperature and, when required, correction values for it and the computation of the rated temperature of the heat source to be adjusted at the control unit. An important element of the regulating and control unit 100 is a climate zone module 113 which contains a non-erasable memory or is designed for the selection of a partial region of the non-erasable memory 114 of the microcomputer 120, in which values of the theoretical mean outside temperature assigned to calendar days and, when required, to times of the day or theoretical rated-value temperatures of the heat source for specific given climatic zones, are stored. Furthermore, the climate-zone module 113 is preferably also so designed that it initiates the time intervals for the respective scanning times for the change of the rated temperature of the heat source.

The climate zone module 131 is favourably so designed that it is replaceable and can be plugged in so that it is possible by simply replacing the climate-zone module to adapt the apparatus according to the present invention to the climate zone of the site of operation without requiring additionally any calibrating or adjusting work.

As an alternative, a coding circuit with which addresses intended for selecting climate zones can be dialled in the non-erasable memory can be provided.

Output signals from a boiler temperature sensor 131, a flow temperature sensor 132 and a storage temperature sensor 133 to the regulating and control unit 100 or to the microcomputer 120 via an A/D converter 123. Furthermore, the microcomputer also has a universal interface 126 via which a data exchange with an eternal data bank, for example, via a modem, the connection of a printer or of service and diagnostic devices are possible. The regulating and control device also comprises a driver stage 125 and power relay 124 for providing output signals 141–145 for the mixing valve, the burner, the heating circuit pump and a storage charge pump, respectively.

The apparatus illustrated in FIG. 9 also has an operating unit 112 with a diurnal or week switch clock 111 into which index values of controlled variables can be fed via the usual input means, such as keys, bank of keys or a keyboard, for example, for the mode of operation of the heating plant such as frost protection, day and night operation, preparation of industrial water for increasing or decreasing the temperature for predetermined times, for scanning the storage temperature, the temperature of the heat source and the room temperature, for selecting the respective climate zone and for programming the diurnal or week switch clock.

The apparatus illustrated in FIG. 9 also has an indicator unit having a display 115 on which desired characteristics, particularly the operating method of the heating plant, the temperature of the heat source, the storage temperature, a breakdown in the operation of the heat source, a burner interruption, an error diagnosis, the hour and the weekday, can be read simultaneously, sequentially or individually. The compact apparatus shown in FIG. 9 is simultaneously the control device for the predetermination of the rated temperature of the heat source and control unit, the function of the control unit being carried out by the microcomputer, and preferably a freely discretionary control unit characteristic is given.

The microcomputer of the regulating and control unit of FIG. 9 also is preferably so designed that it allows a discretionary change of the slope and of the absolute temperature position of the temperature profile of the dependence of the rated temperature of the heat source on the theoretical mean outside temperature as a function of the manual input or read-in correction values transmitted by data transfer or stored.

A further preferred embodiment of an apparatus according to the present invention is represented diagrammatically in FIG. 10. It differs from the apparatus shown in FIG. 9 primarily in that the functions of the determination and standardization of the rated temperature of the heat source and of the actual control are carried out in separate components of the apparatus, namely in a process control unit 200 and in a remote control unit 200′ separated therefrom. The two components each are provided with a microcomputer, i.e., intelligent, and are in data communication with each other via an internal interface 250.

The remote control unit 200′ is realized as a remote control since it does not necessarily have to be disposed at or near the heat source.

As in the case of the apparatus of FIG. 9 the remote control unit 200 comprises a microcomputer 220 with a non-erasable memory 214, a preferably replaceable climate-zone module 213 or a corresponding coding switch allowing an assignment of addresses with regard to various climate zones in a non-erasable memory, a control-unit-specific timer circuit 210 and an A/D converter to which the output signal 234 of a room temperature sensor is fed. As described above, the room temperature sensor allows an additional correction of the theoretical mean outside temperatures. Via the internal interface 250, which preferably is a two-wire interface, the actual instantaneous and rated temperature of the heat source as well as information on corresponding disturbances, for example, a breakdown of the burner and, when required, data on the actual and rated temperature of an industrial water storage tank are exchanged.

Since the remote control unit 200′ is connected to a room temperature sensor, the microcomputer 220 can carry out, on the basis of the output signal 234 of the room temperature sensor, a correction of the values of the rated temperature of the heat source read-out from the temperature profile of the dependence of the rated temperature of the heat source on the theoretical mean outside temperature.

The remote control unit 200′ is provided with voltage by the control system preferably via the internal interface 250. However, as in the case shown in FIG. 9 the voltage can also be supplied independently. The microcomputer 220 of the remote control unit 200′ carries out operations similar to those carried out by the microcomputer 120 of the apparatus 100 of FIG. 9 except the control function and the operation of the universal interface 126.

Furthermore, with regard to the software the microcomputer 220′ of the remote control unit 200′ is so designed that it determines the heating rate of the heat source via the output signals of the boiler temperature sensor and by means of direct correction or by reading out corresponding correction values stored in a non-erasable memory it correspondingly corrects the rated temperature of the heat source that results from the theoretical mean outside temperature.

The remote control unit 200′ also comprises a diurnal or week switch clock 211, an operation device 212 and a display unit 215 which have fundamentally the same structure and the same functions as those of the compact apparatus shown in FIG. 9.

The remote control unit 200 of the apparatus according to the present invention shown in FIG. 10 is usually disposed on, in or at the heat source. It comprises an internal interface 250 for data transfer between process control unit 200 and remote control unit 200′, an A/D converter 233 for the A/D conversion of output signals 213–233 from a boiler temperature sensor, a flow temperature sensor and a storage temperature sensor respectively as well as a central processing unit (CPU), a random access memory and a non-erasable memory 220–222 as well as a driver stage 225 for power relays and/or selecting devices 224 for supplying signals 241–245 to one or more actuators, to which relays or actuators are in turn connected. In the case shown in FIG. 10 the driver stage selects power relays 224 providing the control signals 241–245 for controlling a burner in a heating boiler, a heating circuit pump, a storage charging pump and a mixing valve.

The microcomputer 220-222 of the process control unit 200 preferably carries out particularly the following operations: comparison of the rated and actual temperatures, selection of relays and/or actuators as a function of the rated and actual temperatures according to predetermined, fixed or discretionary control system characteristic, operation of the interface for the remote control unit 200' and data conversion of the internal interface 250.

Furthermore, it operates and is designed for the selection of a printer, the attachment of a modem and/or the attachment of a service and diagnostic device via universal interface 226 by which the apparatus according to the present invention can also be externally controlled or supplied with data, for example, by direct data transfer, for instance, from meteorological stations, satellites, the implementor or a service operation and, particularly in the case of transferring actual meteorological data, the value of the rated temperature of the heat source can be adapted automatically to anticyclic or singular weather changes. Furthermore, actual temperatures from weather forecasts, for example, minimal and maximal values of the outside temperatures for the next days can be put in by the plant operator via the remote control unit 200'.

Furthermore, the apparatus according to the present invention can be favourably so designed that it is suitable for connection to centralized multistations. According to a further embodiment the apparatus according to the present invention comprises a device for sensing and receiving an exact time information, for example a receiver for the time signal beamed by the Physikalisch-Technische Bundesanstalt in Brunswick via the Station DC F 77. A timer and/or a switch clock of the apparatus according to the present invention is synchronized with said time signal or the time signal is fed into the microprocessor system as time information. Not only can an automatic exact time synchronization of the apparatus thus be obtained but an automatic switch-over, for example, from summer time to winter can also be obtained so that this type of apparatus operates completely automatically and when starting the apparatus a time adjustment by an attendant is not required.

Furthermore, the apparatus can be so designed or be programmable that during specific time intervals fixed, for example, by a current generating plant, the heating or cooling plant concerned cannot be operated or operated only with reduced capacity. This is particularly important for heat pumps with electric drive.

The microcomputer 220-222 of the process control unit 200 of the apparatus of FIG. 10 also is preferably so designed that it allows a discretionary variation of the slope and of the absolute temperature position of the temperature profile of the dependence of the rated temperature of the heat source on the theoretical mean outside temperature as a function of manual input of correction values either read-in, transferred by data transfer or stored.

The process control unit 200 normally has a predetermined fixed control characteristic, but it can also be so designed that it has a discretionary variable control characteristic, which can also be changed, when required, by data transfer from an external data bank.

Particularly ROMs, PROMs, EPROMs and/or EEPROMs are suitable as non-erasable memories for the apparatuses according to the present invention.

In the case of a "learning" apparatus according to the present invention the microcomputer 220' of remote control unit 200' is so designed with regard to the software that it takes charge of the effective values of the rated temperature of the heat source present after the correction or of the correction values in a non-erasable memory and uses them as a data base for the next operating cycle, particularly a calendar year. Furthermore, these microcomputer systems can also be so designed that they are reprogrammable via the universal interface of the control system, preferably by transfer of data from an external data bank.

Just like process control unit 200, remote control unit 200' shown in FIG. 10 can be constructed in modular design, the remote control unit 200' having particularly a timer module, a clock or software module, a microcomputer module and a memory module with a non-erasable memory as well as a module for the display unit and a module for the operating unit.

Heating plants provided with an apparatus according to the present invention can additionally be provided with window contacts by means of which the opening of windows for ventilation can be determined and the heat supply can be reduced correspondingly. These devices are disclosed in German patent document DE-05 34 41 695.

Furthermore, the plant operator can adjust the individually desired room temperatures via the operating unit and also preset corresponding lowering programs for reduced operation.

The variation of the day and night values of the rated temperature of the heat or cooling source results in a variation of the temperature of the heat or cooling source which, in particular, is proportional, and the slope of the temperature profile can be taken into account.

As compared with conventional methods and apparatuses for the temperature control of heating and cooling plants the present invention provides substantial advantages:

Because of the fact that the temperature profile of the theoretical mean outside temperature, particularly for the period of a calendar year, is directly available from a non-erasable memory, a control of the rated temperature of the heat or cooling source can also be carried out without an outside temperature sensor. On the basis of particularly the correction via the heating rate of the heat source or the cooling rate of the cooling source or analogous correction parameters, the rated temperature is adapted to the real temperature conditions to a very great extent. This is associated with substantial savings in costs since the outside temperature sensor and corresponding conduits can be dispensed with. A further advantage lies in that the system can be mounted in a simple manner. This results in substantial savings of costs, particularly in the renovation of old buildings.

A time-proportional control of the rated temperature of heat or cooling sources relative to the outside temperature is thus also attained without outside temperature sensor and, compared with conventional systems, even the relation of time to the applied stored data of the theoretical mean outside temperature, i.e., the lead of the hysteresis, can be freely selected.

Furthermore, systems according to the present invention can be readily adapted to various climatic zones since for this purpose it is merely required to replace the climatic zone module or to feed in the climatic zone coding.

A further advantage lies in that individual living or heating habits are automatically taken into account.

The entire system is distinguished by simple installation and simple initiation. This is a special advantage since experience has shown that laymen usually have great difficulties in correctly adjusting the desired values of controlled variables, as for example, specific heating curves to be selected, slopes, etc., for example, of heating control systems.

At the same time a heating or cooling system provided with the apparatus according to the present invention is always adapted to the given outside temperature or seasonal temperature situation depending on requirements. By special software, such factors as annual maxima and annual minima outside temperatures, the daily trend of the outside temperature, particularly the increase in the outside temperature due to the position of the sun between approximately 10 a.m. and 4 p.m., meteorological singularities and the temperature profiles for the various climatic zones can automatically be taken into account in the correction of the theoretical mean outside temperature, and the hysteresis or the operating time of the burner as a function of the temperature profile of a given climate zone can thus also be taken into account.

A further advantage lies in the trend-setting controllability and selectability of the apparatus according to the present invention by external data banks of any kind so that, for example, an automatic adaptation to prevailing outside temperatures, anticyclic weather situations and meteorological singularities is feasible. By means of the remote controlled reprogramming and/or time synchronization of the system, for example, from an operating centre, the continuous or discontinuous remote diagnosis for monitoring and operational purposes and the remote controlled time synchronization, for example, via the time signal of Physikalisch-Technische Bundesanstalt in Brunswick, a manual change-over or reprogramming on changing from summer to winter time or vice versa can be carried out automatically.

Therefore, as compared with conventional methods and apparatuses, the present invention is associated with substantial technological and economic advantages.

What is claimed is:

1. A Method for controlling temperature of centralized and decentralized heating plants having:
   a heat source of variable and adjustable temperature which supplies heat to heat consumers, such as radiators;
   by controlling the temperature of the heat source according to a rated temperature which is controlled as a function of a reference temperature which is variable with time, wherein the rated temperature of the heat source is regulated without reference to the actual outside temperature according to a given characteristic corresponding to specific calendar dates.

2. A method according to claim 1, wherein said characteristic is the theoretical mean outside temperature of the climatic zone concerned in which the heating plant is located, said theoretical mean outside temperatures being additionally assigned to specific times of the day.

3. A method for controlling temperatures of centralized and decentralized cooling and air conditioning plants having:
   a cooling source of variable and adjustable temperature to which heat is supplied from heat sources, such as coolers;
   by controlling the temperature of the cooling source according to a rated temperature which is regulated as a function of a reference temperature which is variable with time, wherein the rated temperature of the cooling source is regulated without reference to the actual outside temperature by means of a given characteristic according to specific calendar dates.

4. A method according to claim 3, wherein said characteristic is the theoretical mean outside temperatures of the climatic zone concerned in which the cooling plant is located, said mean theoretical outside temperature being additionally assigned to specific times of the day.

5. A method according to claim 1 or 2, wherein the heat source whose temperature is being controlled is a heating boiler.

6. A method according to claim 1 or 2, wherein the heat source whose temperature is being controlled is the forward flow of a multiple-way mixing valve which, in a closed circulation of a fluid heat transfer medium, is connected to a heating boiler.

7. A method according to claim 1 or 2, wherein the heat source whose temperature is being controlled is the liquefier of a heat pump, the liquefier being designed as a heat exchanger.

8. A method according to claim 1 or 2, wherein the heat source whose temperature is being controlled is the heat accumulator of an electric storage heater.

9. A method according to claim 1 or 2, wherein the heat source whose temperature is being controlled is an electric heating resistor.

10. A method according to claim 1 or 2, wherein the heat source whose temperature is being controlled is a heat accumulator wherein the control is carried out via the thoughput of the heat transfer medium in a heat exchanger.

11. A method according to claim 3 or 4, wherein the cooling source whose temperature is being controlled is the evaporator of a compression refrigerating machine, said evaporator being a heat exchanger.

12. A method according to claim 3 or 4, wherein the cooling source whose temperature is being controlled is the evaporator of an absorption refrigerating machine, said evaporator being a heat exchanger.

13. A method according to claim 3 or 4, wherein the cooling source whose temperature is being controlled is a Peletier element connected to a heat exchanger.

14. A method according to claim 3 or 4, wherein the cooling source whose temperature is being controlled is a cold accumulator and wherein the control is carried out via the throughput of the heat transfer medium in a heat exchanger.

15. A method according to one of the claims 1 to 4, wherein water, organic solvents, high-boiling hydrocarbons, aqueous and/or organic solvent of antifreezes and/or anticorrosives, gases and gas mixtures such as air, ammonia gas, carbon dioxide, fluorinated and perfluorinated hydrocarbons, particularly Frigens and Freons, are applied as said fluid heat transfer media.

16. A method according to one of the claims 1 to 4, wherein the characteristics or discrete individual values of the theoretical mean outside temperature, and the characteristic or discrete individual values of the rated temperature of the heat or cooling source resulting at the time in question from the theoretical mean outside temperature are stored for predetermined times of a calendar year in a non-erasable memory.

17. A method according to claim 16, wherein the characteristics of discrete individual values of the theoretical mean outside temperature and the characteristic or discrete individual values of the rated temperature of the heat or cooling source resulting at the time in question from the theoretical mean outside temperature are additionally stored for daytimes assigned to specific calendar days and for at least one climatic zone.

18. A method according to claim 16, wherein the storage is carried out by ROMs, PROMs, EPROMs or EEPROMs provided with a microcomputer.

19. A method according to claim 16, wherein the values of the theoretical mean outside temperature and the values of the thus resulting rated temperatures of the heat or cooling source are digitally stored in Tables in more-dimensional characteristic diagrams and called in therefrom.

20. A method according to claim 18, wherein the rated temperature of the heat source resulting at a given time from the theoretical mean outside temperature is corrected by means of families of characteristics, such as a characteristic diagram with discrete correction values present at any scanning time or on the basis of direct data input from an external data bank and wherein the resulting corrected value is used as rated temperature for the heat source.

21. A method according to one of the claims 1 to 4, wherein the timed temperature gradient resulting when heating the heat source or cooling the cooling source and the rated temperature of the heat or cooling source resulting from the theoretical mean outside temperature is corrected according to a predetermined characteristic via the determined temperature gradient in accordance with heat or cooling requirements of the system.

22. A method according to one of the claims 1 to 4, wherein the position of a multiple way mixing valve provided in a closed circulation of the fluid heat transfer medium and the rated temperature of the heat based on the theoretical mean outside temperature is corrected according to a predetermined characteristic via the detected position of the mixing valve.

23. A method according to one of the claims 1 to 4, wherein the rated temperature of the heat or cooling source obtained on the basis of the theoretical mean outside temperature is additionally corrected for specific calendar dates based on meteorological singularities according to a predetermined characteristic.

24. A method according to claim 20, wherein the theoretical mean outside temperatures for all the scanning times of a calendar year are stored for at least one climate zone in a non-erasable memory in the form of pairs of values of outside temperature and time which are matched on each other and wherein the corresponding theoretical mean outside temperatures for the respective scanning times are read-out from the non-erasable memory by the central processing unit of the microcomputer and used for computing the rated temperature of the heat or cooling source.

25. A method according to claim 24, wherein the correction of the rated temperature of the heat or cooling source is carried out by the microcomputer.

26. A method according to claim 25, wherein the correction values for the rated temperature of the heat or cooling source, for all scanning times of a calendar year, are stored in a memory and read out therefrom by the microcomputer.

27. A method according to claim 26, wherein the theoretical mean outside temperatures and the correction values of the rated temperature of the heat or cooling source for all scanning times of a calendar year as well as for one of several climate zones are stored in the form of more-dimensional maps.

28. A method according to claim 26, wherein the theoretical mean outside temperatures and the correction values of the rated temperature of the heat or cooling source for all scanning times of a calendar year as well as for one of several climate zones are stored in ROMs, PROMs, EPROMs, or EEPROMs.

29. A method according to one of the claims 1 to 4, wherein the values of the theoretical mean outside temperature and the correction values of the rated temperature of the heat or cooling source for all scanning times of a calendar year and for one of several climate zones are prestored in a data bank and read in by the microcomputer.

30. A method according to claim 27, wherein the temperature of the heat source in intermittent operation is controlled via the time of operation of the burner provided in a heating boiler.

31. A method according to claim 1 or 2, wherein the control of the rated temperature of the heat source is switched off on the basis of the theoretical mean outside temperature, upon heating process water by the heat source, via a process water processor connected thereto and wherein the rated temperature of the heat source resulting from the theoretical mean outside temperature is so corrected that a predetermined forward-flow and process water temperature is attained.

32. A method according to claim 1 or 2, wherein at reduced operation during the night the rated temperature of the heat source obtained on the basis of the theoretical mean outside temperature is corrected corresponding to a predetermined characteristic.

33. A method according to one of the claims 1 to 4, wherein there is used a "learning" microcomputer system whose data stored in a non-erasable memory are updated for the theoretical mean outside temperature and corresponding correction values on the basis of a learning program during a predetermined time.

34. A method according to one of the claims 1 to 4, wherein the control of the rated temperature of the heat or cooling source with regard to the stored data values of the theoretical mean outside temperature corresponding to the respective scanning time and the correction data is carried out with a predetermined preshift per unit time.

35. A method according to one of the claims 1 to 4, wherein for the theoretical mean outside temperature for each calendar day of a year in the time range of between approximately 10 AM and approximately 4 PM the value of the theoretical mean outside temperature corresponding to approximately 10 AM and approximately 4 PM is used and corrected with a predetermined or computed correction value.

36. A method according to one of the claims 1 to 4, wherein the minimum time intervals of the scanning times of the theoretical mean outside temperatures are fixed on the basis of the predetermined stages of the rated temperature of the heat or cooling source.

37. A method according to one of the claims 1 to 4, wherein the scan of the theoretical mean outside temperature is carried out at regular time intervals.

38. A method according to one of the claims 1 to 4, wherein the scan of the theoretical mean outside temperature is carried out at regular time intervals which depend on calendar dates in a predetermined manner.

39. An apparatus for controlling temperatures of centralized and decentralized heating plants, and cooling plants having a heat or cooling source respectively from which heat or cold respectively is supplied to objects to be heated or cooled respectively, comprising:
- a device for controlling the temperature of the heat or cooling source according to a variable and adjustable rated temperature and a device for controlling the rated temperature of the heat or cooling source as a function of a reference temperature that is variable with time, wherein the device for controlling the rated temperature of the heat or cooling source:
  - controls the rated temperature of the heat or cooling source by means of a predetermined characteristic according to specific calendar dates; and comprises
    - at least one non-erasable memory for storing the characteristic or discrete individual values of the characteristic of the rated temperature of the heat or cooling source and corresponding correction values for predetermined dates of a calendar year and time points of a day, and;
    - a device for scanning or reading out the characteristics and discrete values which are stored in the non-erasable memory at predetermined scanning times for the control of the rated temperature of the heat or cooling source.

40. The apparatus according to claim 39, wherein said device for controlling the rated temperature of the heat or cooling source controls the rated temperature of the heat or cooling source additionally according the theoretical mean outside temperatures of the climate zone concerned in which the heating and cooling plant is located, said theoretical mean outside temperatures being assigned to specific times of the day, said non-erasable memory is adapted for additionally storing the theoretical mean outside temperature obtained in a given case on the basis of the theoretical mean outside temperature for one or several climate zones that are assigned to specific calendar days.

41. The apparatus according to claim 39 or 40, wherein the device for controlling the rated temperature of the heat or cooling source additionally comprises a device for reading in the corresponding values into the non-erasable memory.

42. The apparatus according to one of the claims 39 or 40, wherein the device for controlling the rated temperature of the heat or cooling source includes a device for receiving values of the theoretical mean outside temperature and of the resulting rated temperature of the heat or cooling source and corresponding correction values from a remote control device for controlling the rated temperature of the heat or cooling source.

43. The apparatus according to claim 42, wherein said device for controlling the rated temperature of the heat or cooling source further includes a device for feeding back of the temperature values and reference variables to the external data bank or the remote control device.

44. The apparatus according to one of the claims 39 or 40, wherein at least the device for controlling the rated temperature of the heat or cooling source has a microcomputer with a central processing unit (CPU), a random access memory (RAM), at least one non-erasable memory and an E/A interface and wherein temperature sensors are provided for determining the actual temperature of the heat or cooling source, the heat consumers and suppliers.

45. The apparatus according to one of the claims 39 or 40, further comprising a control and regulating unit having:
- a microcomputer with a central processing unit (CPU), a random access memory (RAM) and non-erasable memory for storing;
  - calendar dates;
  - theoretical mean outside temperatures for one or several climate zones, said temperatures being assigned to times of the day;
  - correction values for the theoretical mean outside temperatures;
  - corrected values for the theoretical mean outside temperatures;
  - rated temperatures of the heat and cooling source;
  - correction values of the rated temperatures of the heat or cooling source;
  - rated temperatures for day, night and frost protection operations;
  - calibrating values of the control-unit parameters; and
  - corresponding data values called-in or received from an external data bank;
- which carries out substantially the following operations:
  - processing the input data;
  - time-controlled scan of the stored theoretical mean outside temperatures and, additionally, of correction values or of stored rated temperatures at predetermined scanning times;
  - reception of corresponding data values from an external data bank;
- determination of the rated temperatures of the heat or cooling source or of the heat transfer medium as a function of the respective calendar data and additionally of the theoretical mean outside temperature of the climate zone concerned at specific predetermined scanning times, said outside temperature being assigned to the respective time of a day;
  - correction of the rated temperature of the heat or cooling source obtained on the basis of the theoretical mean outside temperature for the predetermined scanning times;
  - control of the control unit of the heat source after data conversion;
  - comparison of the rated and actual temperatures;
  - selection of actuators as a function of the rated and actual temperatures according to predetermined control characteristic;
  - operation of one or several interfaces and data conversion of data from an A/D converter for the A/D conversion of the analog output signals of the temperature sensors;
  - driver units for selection devices for actuators; and at least
  - one actuator for selecting burners in heating boilers, mixing valves, circulation pumps, control valves and/or storage charge pumps.

46. The apparatus according to claim 45, wherein the control and regulating unit is divided in:
(A) a remote control unit independent of the heat or cooling source and having:
- a first microcomputer with a first central processing unit, a first random access memory and a first non-erasable memory for storing calendar dates, theoretical mean outside temperatures for at least one climate zone assigned to times of the day;

correction values for the theoretical mean outside temperatures;

corrected values for the theoretical mean outside temperatures;

rated temperatures of the heat or cooling source;

correction values of the rated temperatures of the heat or cooling source;

rated temperatures for day, night and frost protection operation;

calibrating values of control unit parameters, and corresponding data values called-in or received from an external data bank or control device;

which substantially carries out the following operations:

processing the input data;

time-controlled scan of the stored theoretical mean outside temperatures and the correction values or stored rated temperatures at predetermined scanning times;

reception or call-in of corresponding data values from an external data bank or control device;

determination of the rated temperature of the heat or cooling source as a function of the respective calendar data and;

additionally of the theoretical mean outside temperature of the climate zone concerned at specific predetermined scanning times, said temperature being assigned to the respective time of the day;

correction of the rated temperature of the heat or cooling source obtained on the basis of the theoretical mean outside temperature for the predetermined scanning times; and control of the control system of the heat source, after data conversion as well as via an interface; and (B) a process control unit for the temperature of the heat or cooling source, said process control unit being provided on or at the heat or cooling source, with:

an interface for the data transfer between the remote control unit and process control unit;

an A/D converter for the A/D conversion of the analog output signals of the temperature sensors;

a second microcomputer with a second central processing unit, a second random access memory and a second non-erasable memory which carries out the following operations:

comparison of the rated and actual temperatures;

selection of actuators as a function of the rated and actual temperatures according to predetermined control system characteristic;

operation of the interface for the control unit and data conversion for the interface;

driver units for selection units for actuators; and at least one or several actuators for the selection of the heat production devices of the heat source and of the cold production device of the cooling burners in heating boilers, of mixing valves, circulation pumps, control valves and/or storage charge pumps.

47. The apparatus according to claim 46, wherein the remote control unit has an operating unit by means of which reference variables for the control are put in via conventional means, such as key sets, for the mode of operation of the heating and cooling plant such as frost protection, day and night operation, processing of process water, for raising and lowering the temperature of the heat or cooling source for predetermined times, for scanning the storage temperature, the temperature of the heat or cooling source and the room temperature, for selecting the corresponding climate zone and for programming a day or week clock relay.

48. The apparatus according to claim 46, wherein the remote control unit has an indicator unit by means of whose display characteristic ratings, the mode of operation of the heating and cooling plant, the temperature of the heat or cooling source, the storage temperature, the room temperature, a breakdown in the operation of the heat or cooling source such as a breakdown of the burner, an error diagnosis, the time and weekday are displayed.

49. The apparatus according to claim 46, wherein the remote control unit is connected via an A/D converter to a room temperature sensor and the first microcomputer is so designed that it corrects on the basis of the output signal of the room temperature sensor the values of the rated temperature of the heat or cooling source selected from the temperature profile of the dependence of the rated temperature on the theoretical mean outside temperature.

50. The apparatus according to claim 46, wherein the first microcomputer is so designed that it allows a discretionary modification of the slope and of the absolute temperature position of the temperature profile of the dependence of the rated temperature of the heat or cooling source on the theoretical mean outside temperature as a function of input correction values.

51. The apparatus according to claim 46, wherein the interface of said process control unit is adapted for the connection of a printer, for the connection of a modem and for the connection of a service or diagnostic device.

52. The apparatus according to claim 46, wherein the remote control unit is supplied with voltage by the process control system via the internal interface.

53. The apparatus according to claim 46, wherein the remote control unit has a removable climate-zone module which is designed for selecting a partial region of the non-erasable memory of the remote control unit in which there are stored values of the theoretical mean outside temperature for specific predetermined climate zones which are assigned to calendar dates.

54. The apparatus according to claim 46, wherein the theoretical mean outside temperatures corresponding to various climate zones and assigned to predetermined calendar dates and corresponding corrected values of the rated temperatures of the heat or cooling source are coded in equivalence to the corresponding climate zones.

55. The apparatus according to claim 46, wherein the regulating device and the process control unit have a discretionary regulating characteristic.

56. The apparatus according to claim 46, wherein the remote control unit is so designed that it determines the rate of heating of the heat source and the rate of cooling of the cooling source due to the connected system via the output signals of at least one temperature sensor and by direct correction values of the rated temperature of the heat or cooling source resulting from the theoretical mean outside temperature.

57. The apparatus according to claim 46, wherein it is designed for the control of the temperature of heating boilers as heat sources via the time of operation of gas or oil burners provided therein.

58. The apparatus according to claim 46, wherein it is designed as a heat source for the control of the flow temperature in central heating plants with closed circulation of a fluid heat transfer medium via a multiple-way mixing valve connected to a heating boiler.

59. The apparatus according to claim 46, further comprising ROMs, PROMs, EPROMs and/or EEPROMs as non-erasable memories in which the data values of the theoretical mean outside temperature are stored for all the calendar days of a calendar year and for specific corresponding times of the day for given climate zones.

60. The apparatus according to claim 46, said remote control unit comprising an adaptive microcomputer, which is so designed that it stores in a non-erasable memory through a given scanning cycle the corrected, effective rated temperatures of the heat source for any scanning time and uses these updated stored data for the next scanning cycle.

61. The apparatus according to claim 46, wherein the respective climate zone in the control system is taken into account by corresponding coding.

* * * * *